(12) United States Patent
Tu

(10) Patent No.: US 11,378,280 B1
(45) Date of Patent: Jul. 5, 2022

(54) GEAR TWO-WAY CLUTCHING MECHANISM

(71) Applicant: Tse-Ju Tu, Taoyuan (TW)

(72) Inventor: Tse-Ju Tu, Taoyuan (TW)

( * ) Notice: Subject to any disclaimer, the term of this patent is extended or adjusted under 35 U.S.C. 154(b) by 0 days.

(21) Appl. No.: 17/172,599

(22) Filed: Feb. 10, 2021

(30) Foreign Application Priority Data

Jan. 18, 2021 (TW) .................................. 110101833

(51) Int. Cl.
*F16H 1/12* (2006.01)
*F16H 1/20* (2006.01)
*F24C 3/12* (2006.01)
*F16H 1/22* (2006.01)
*F16H 1/26* (2006.01)

(52) U.S. Cl.
CPC ............... *F24C 3/122* (2013.01); *F16H 1/22* (2013.01); *F16H 1/26* (2013.01)

(58) Field of Classification Search
CPC ... F16H 1/22; F16H 27/08; F16H 1/26; F24C 3/122
USPC .................................................. 74/435, 625
See application file for complete search history.

(56) References Cited

U.S. PATENT DOCUMENTS

| 3,822,438 | A | * | 7/1974 | Takenaka | E05F 3/102 74/435 |
|---|---|---|---|---|---|
| 4,379,481 | A | * | 4/1983 | Juner | G01N 23/083 74/435 |
| 4,854,183 | A | * | 8/1989 | Periou | F16H 27/08 74/435 |
| 5,284,064 | A | * | 2/1994 | Green | F16H 27/08 74/435 |
| 8,607,656 | B2 | * | 12/2013 | Sommer | E05F 15/63 74/435 |

* cited by examiner

*Primary Examiner* — Jake Cook
(74) *Attorney, Agent, or Firm* — Rosenberg, Klein & Lee

(57) ABSTRACT

A disclosure relates to a gear two-way clutching mechanism that is acted between the power output and the loading and mainly comprising a power source, a loading, a clutching unit and a deceleration unit. When the first output gear of the loading unit is driven by the power source to rotate to a predetermined position, the teeth missing portion is tangential with and corresponds to the buffer gear, or the wheel teeth portion meshes the buffer gear. The clutching unit connected between the power source, and the loading can perform clutch without working and enables the loading end to freely rotate, or the clutching unit can perform mesh working so that power of the power source is directly outputted to the loading end. With the deceleration unit connected to rear section and/or front section of the clutching unit, speed reduction ratio of the transmission chain connected between the power source and the loading can change to achieve effect of enhancing or changing output torque.

5 Claims, 18 Drawing Sheets

GEAR TWO-WAY CLUTCHING MECHANISM

BACKGROUND OF THE INVENTION

Field of the Invention

The present invention relates to a gear two-way clutching mechanism, and more particularly to a gear two-way clutching mechanism having simple design, pure structure, capable of saving mechanical use space, and enhancing operation efficiencies of mechanism clutching and meshing.

Description of the Related Art

In order to allow the output of motor power to achieve specific purpose or have better efficiency, a clutch mechanism is usually disposed at a transmission chain used in the motor. The design and operation of the clutch mechanism mainly generate clutching effect when the motor is at clockwise rotation or counter wise rotation. The motor transmission chain merely works in singular direction. Although the operation of the motor transmission chain could achieve purpose of anticipated clutching and transmitting power, the clutch mechanism also has shortcomings of complexity, higher production cost and space occupation.

SUMMARY OF THE INVENTION

Therefore, it is a primary objective of the present invention to provide a gear two-way clutching mechanism capable of improving the foregoing shortcomings and enabling the clutching mechanism of the transmission chain disposed between the power source and the loading to have effects of simple design, purified structure, reducing manufacture costs, saving mechanism use space, enhancing operation efficiency of mechanism clutching and meshing.

To achieve the foregoing objective, the disclosure is acted between power output and loading and mainly comprises a power source, a loading, a clutching unit and a deceleration unit. When a first output gear of the clutching unit is driven by the power source to rotate to a predetermined position, a teeth missing portion is tangential with and corresponds to a buffer gear, or a wheel teeth portion is meshed to the buffer gear. The clutching unit connected between the power source and the loading can perform motion of clutching without working and enables the loading end to freely rotate, or the clutching unit can carry out motion of meshing work so that power of the power source is directly outputted to the loading end. With the deceleration unit connected to a rear section and/or a front section of the clutching unit, speed reduction ratio of the transmission chain connected between the power source and the loading can be changed to achieve effect of enhancing or changing output torsional moment.

The technical characteristics, contents, advantages and effects of the present invention will be apparent with the detailed description accompanied with related drawings of two preferred embodiments as follows.

DETAILED DESCRIPTION OF THE PREFERRED EMBODIMENTS

The technical characteristics, contents, advantages and effects of the present invention will be apparent with the detailed description accompanied with related drawings of preferred embodiments as follows.

Figure 1:
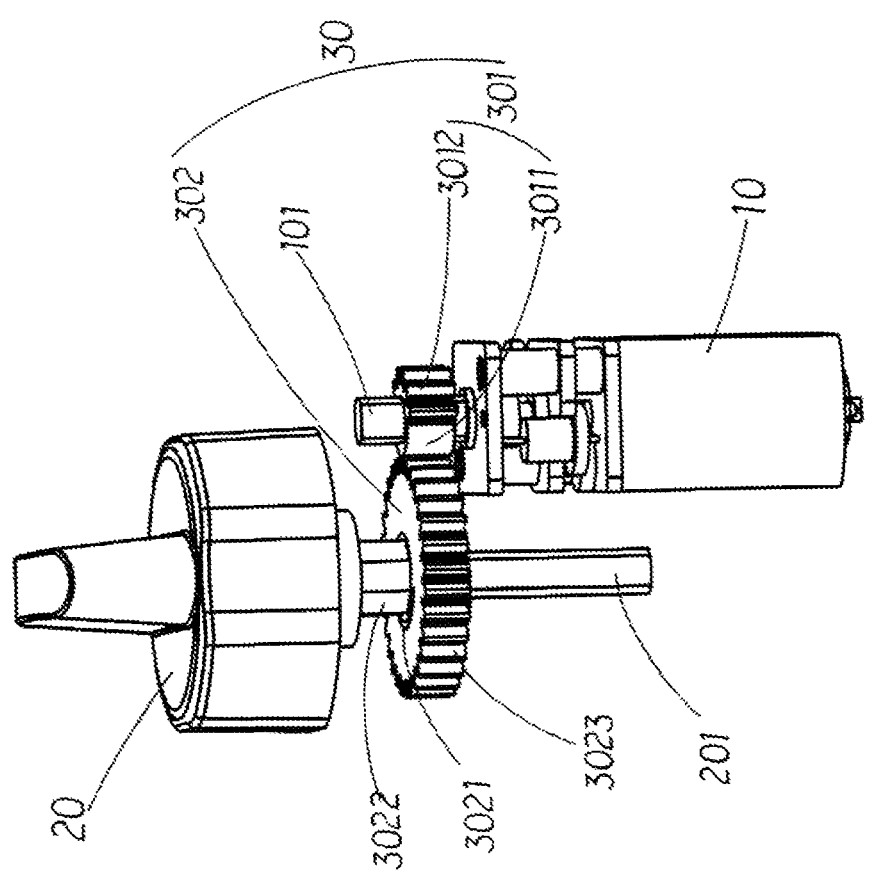
FIG. 1 is a three-dimensional schematic diagram according to a first embodiment of the invention.
Figure 2:
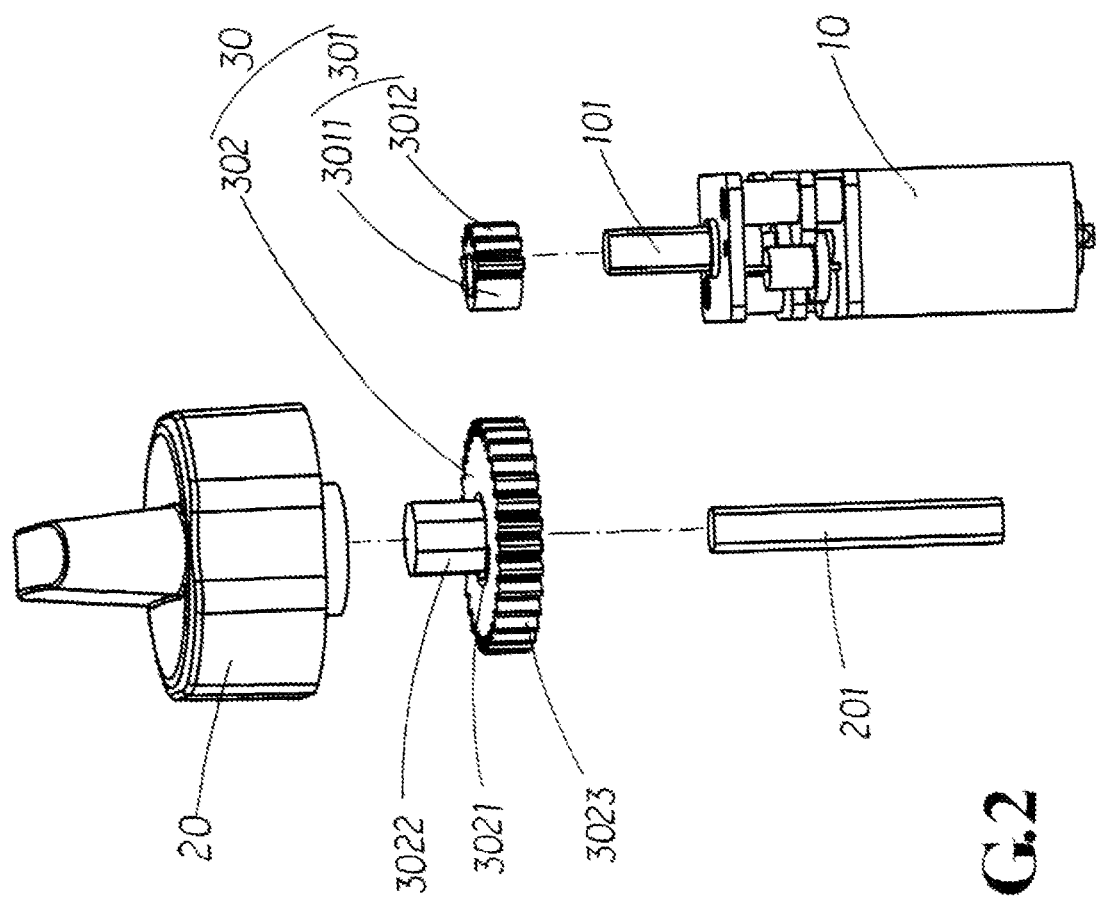
FIG. 2 is a decomposition structure drawing according to FIG. 1.

With reference to FIG. 1 and FIG. 2 a first embodiment illustrates optimum shape that implements the disclosure. A gear two-way clutching mechanism according to the disclosure acts between power output and a loading and mainly comprises a power source 10, a loading 20, a clutching unit 30 and a deceleration unit 40; wherein the power source 10 is provided for outputting power and capable of delivering rotation power to the loading 20 through the clutching unit 30 and disposed with a power output shaft 101; wherein the power source 10 can be a motor assembly.

The loading 20 is connected to the clutching unit 30 and can be driven by rotation power outputted from the power source 10 and disposed with a loading end spindle 201.

The clutching unit 30 is connected between the power output shaft 101 of the power source 10 and the loading end spindle 201 of the loading 20 and capable of transmitting rotation power of the power source 10 to the loading 20 or disconnecting power of the power source 10 from the loading 20 and enables the loading 20 to perform freely rotation motion as idle and disposed with a first output gear 301 and a buffer gear 302. The first output gear 301 is disposed to the power output shaft 101 of the power source 10. The first output gear 301 is disposed with a teeth missing portion 3011 and a wheel teeth portion 3012. The buffer gear 302 is disposed to the loading end spindle 201 of the loading 20 and connected to the first output gear and disposed with a pierced cutting groove 3021 on a circumference so that a gear axle core 3022 and a gear teeth 3023 are form non-rigid connection and occur relative torsional displacement while receiving force.

The wheel teeth portion 3012 of the first output gear 301 and the gear teeth 3023 of the buffer gear 302 are configured as the same modulus to mesh to each other. A quantity of missing teeth from the teeth missing portion 3011 of the first output gear 301 can take a principle that avoids meshing the buffer gear 302. Moreover, the quantity of missing teeth from the teeth missing portion 3011 is roughly not less than two teeth.

Figure 4:
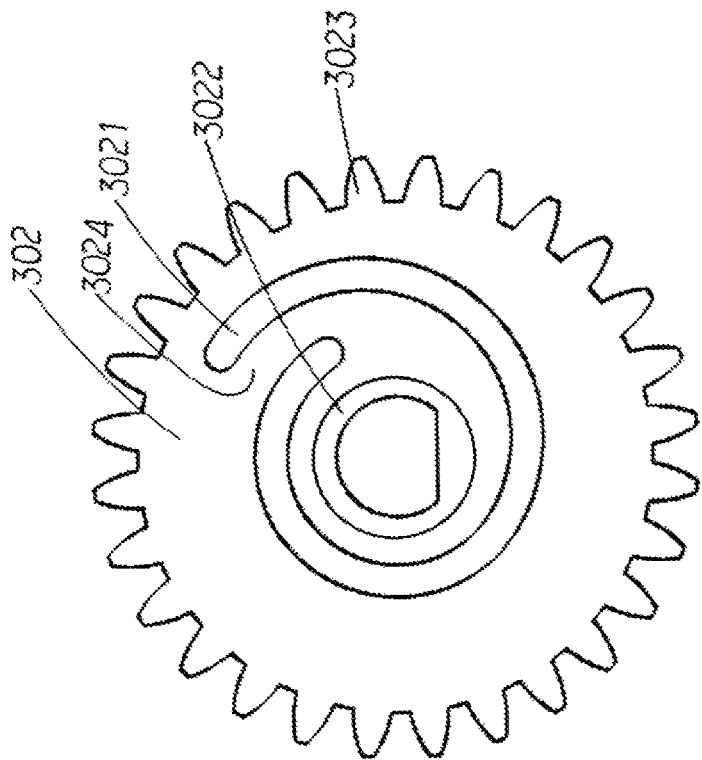
FIG. 4 is a plane schematic diagram of a buffer gear according to an embodiment (II) of the invention.
Figure 3:
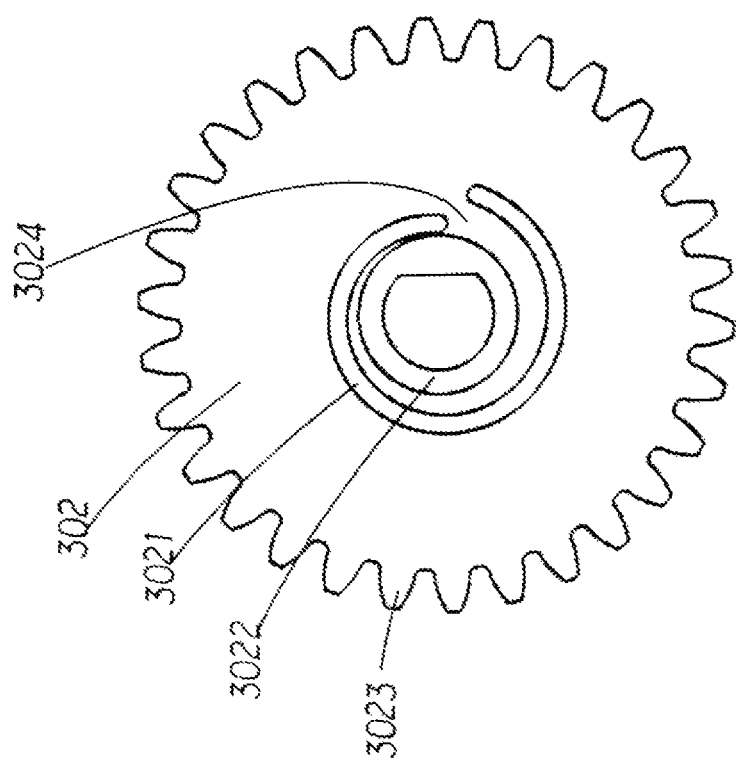
FIG. 3 is a plane schematic diagram of a buffer gear according to an embodiment (I) of the invention.
Figure 6:
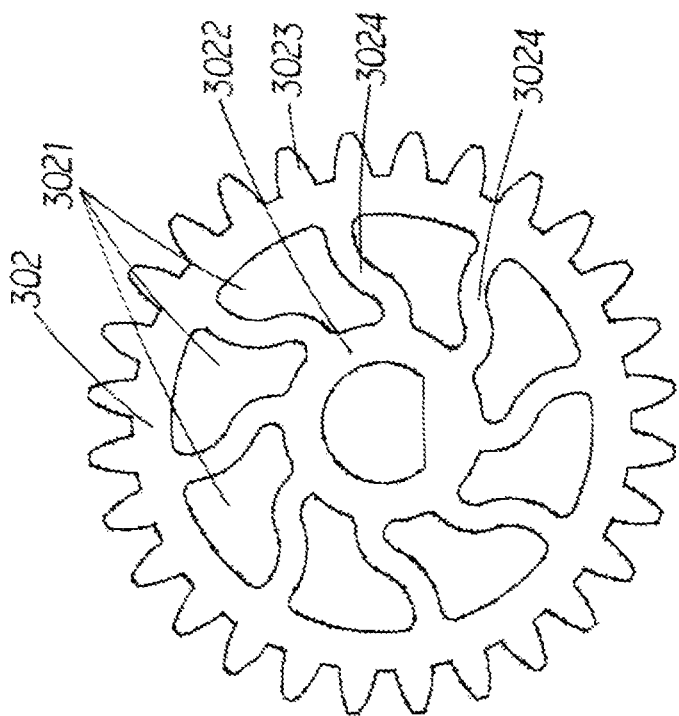
FIG. 6 is a plane schematic diagram of a buffer gear according to an embodiment (IV) of the invention.
Figure 5:
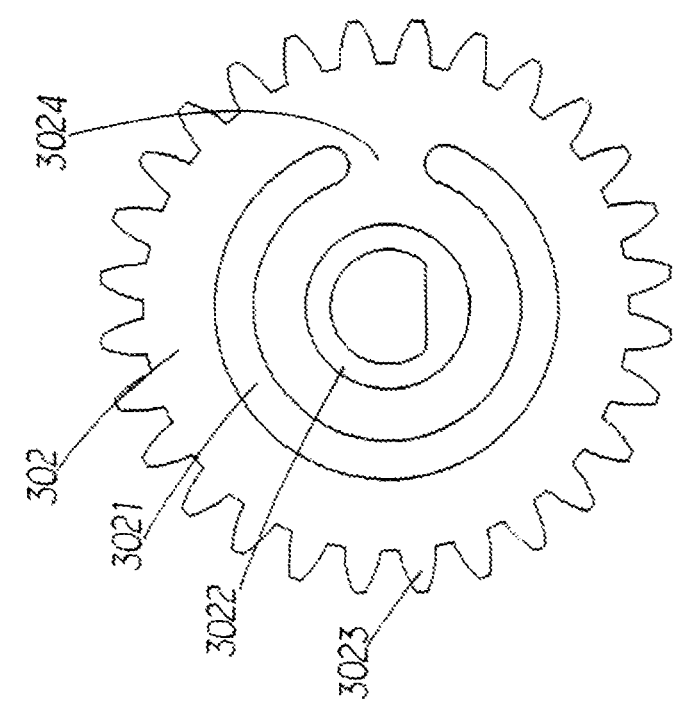
FIG. 5 is a plane schematic diagram of a buffer gear according to an embodiment (III) of the invention.

With reference to FIGS. 3-6, the pierced cutting groove 3021 disposed to the circumference of the buffer gear 302 can be a spiral cutting groove (as shown in FIG. 3 and FIG. 4) or a ring-shaped cutting groove (as shown in FIG. 5) or can be distributed by way of heteromorphy to show plural cutting grooves. A path of the cutting groove 3021 can be defined according to different function curves. A width of the cutting groove 3021 can restrict magnitude of relative torsional displacement between the gear axle core 3022 and the gear teeth 3023. The remaining junction 3024 adjacent to the cutting groove 3021 on the circumference of the buffer gear 302 can decide magnitude of relative torsional flexibility between the gear axle core 3022 and the gear teeth 3023.

Figure 7:
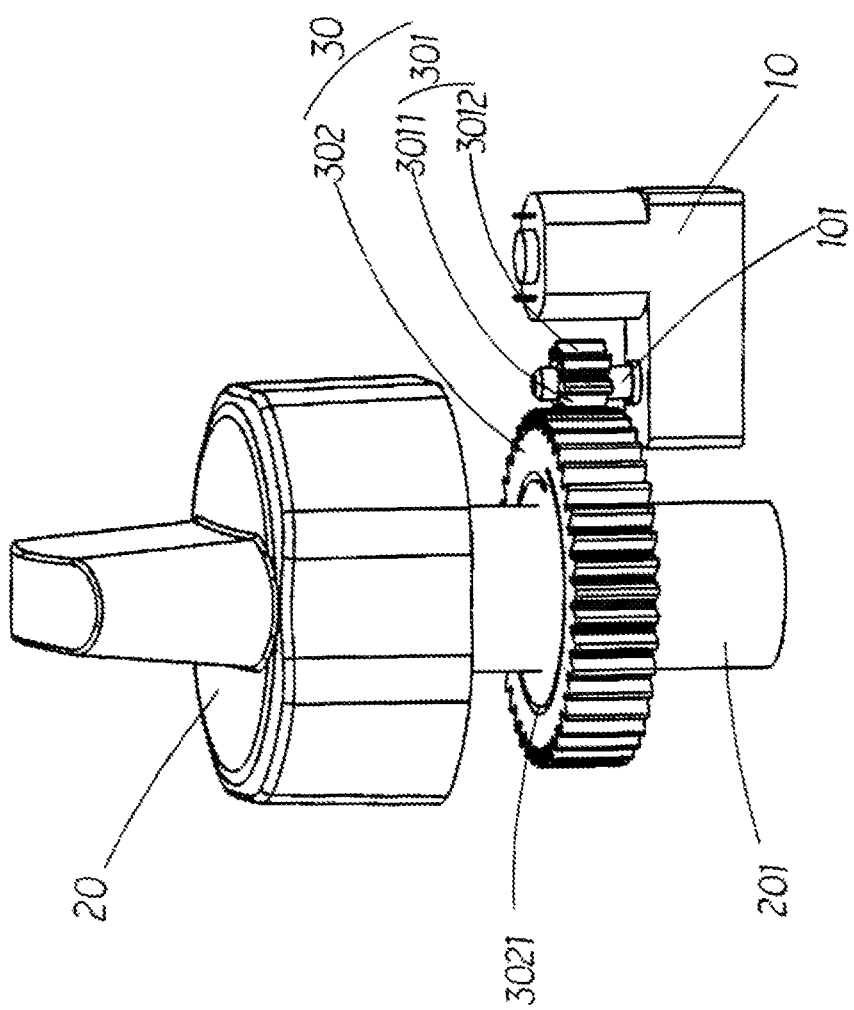
FIG. 7 is a three-dimensional schematic diagram of the first embodiment applied to a stove automatic turning-off machine that shows meshing state according to the invention.
Figure 8:
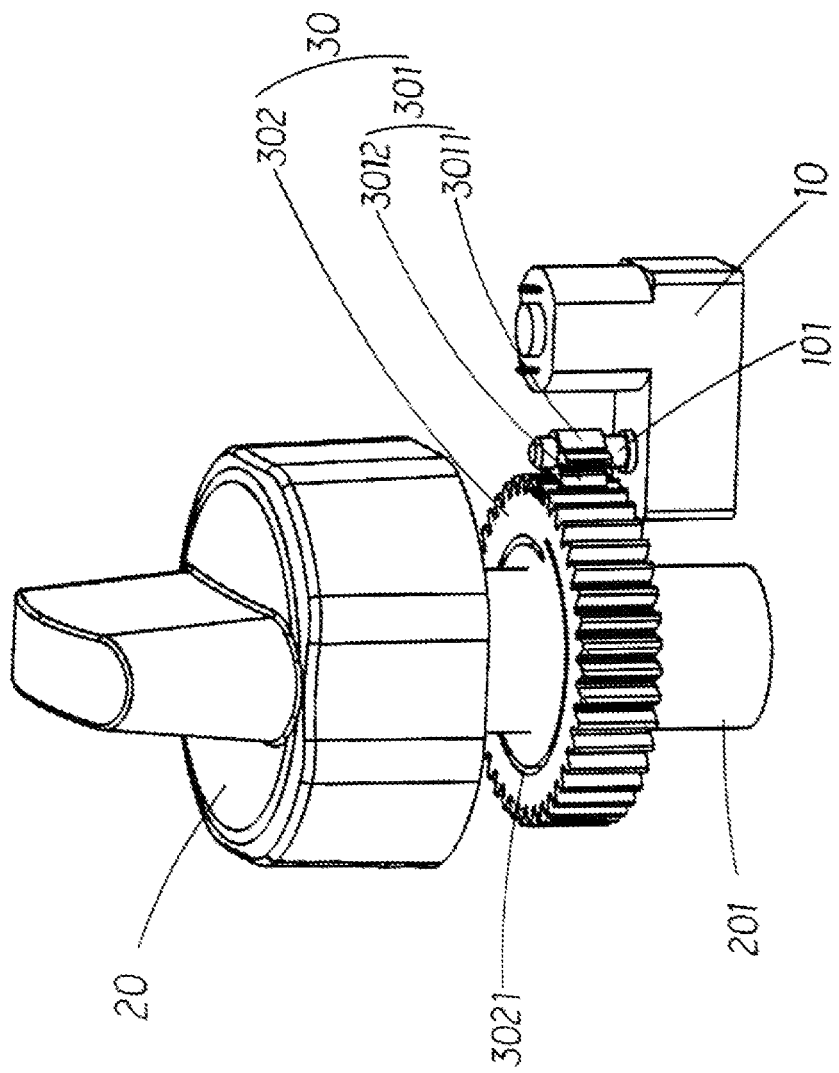
FIG. 8 is a three-dimensional schematic diagram of the first embodiment applied to a stove automatic turning-off machine that shows a non-meshing state according to the invention.

By utilizing the disclosure composed of the foregoing structures, with reference to FIG. 7 and FIG. 8, when the power source 10 output rotation power through the power output shaft 101, the first output gear 301 of the clutching unit 30 disposed in the power output shaft 101 will be driven to rotate. Since the first output gear 310 is disposed with the teeth missing portion 3011 and the wheel teeth portion 3012, the power output shaft 101 is in rotation cycle. When the teeth missing portion 3011 of the first output gear 301 is tangential with and corresponds to the buffer gear 302 (as shown in FIG. 7), the buffer gear 302 and the first output gear 301 show non-mesh clutching state and are unable to be driven to rotate, and the clutching unit 30 is at clutch without working. Afterward the power output shaft 101 of the power source 10 continuously rotates, and the teeth missing portion 3011 of the first output gear 301 rotating in accordance with the power output shaft 101 will rotate and come off the buffer gear 302, and the wheel teeth portion 3012 instantly re-meshes the buffer gear 302 (as shown in FIG. 8) so that the buffer gear 302 is driven to rotate, and the loading end spindle 201 is also rotated. Moreover, the clutching unit 30 can re-work on the loading 20 by showing meshed state.

With the disclosure composed of the foregoing structures, when the power source 10 drives the first output gear 301 to rotate and the wheel teeth portion 3012 meshes the buffer gear 302 to enter meshed state, the clutching unit 30 will work on the loading 20 for outputting. When the power source 10 drives the first output gear 301 to rotate and the teeth missing portion 301 is tangential with and corresponds to the buffer gear 302 to enter clutching state, the clutching unit 30 is disconnected from the loading 20 to enable the loading 20 to freely rotate.

Figure 9:
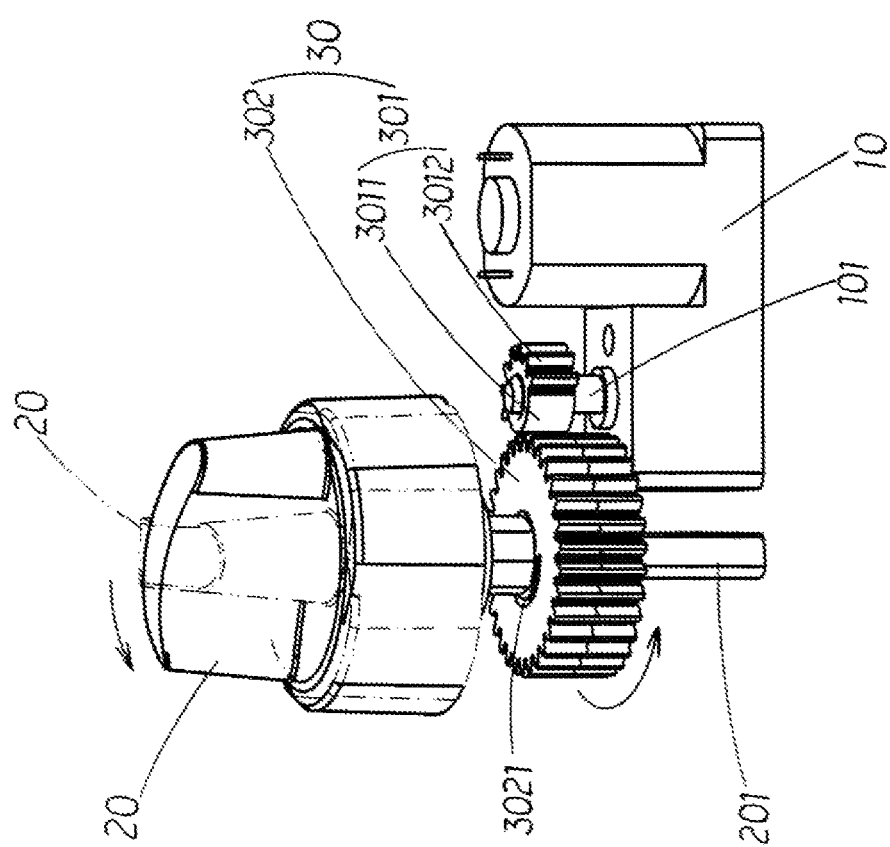
FIG. 9 is a three-dimensional schematic diagram of the first embodiment applied to a stove automatic turning-off machine that performs ignition operation according to the invention.
Figure 10:
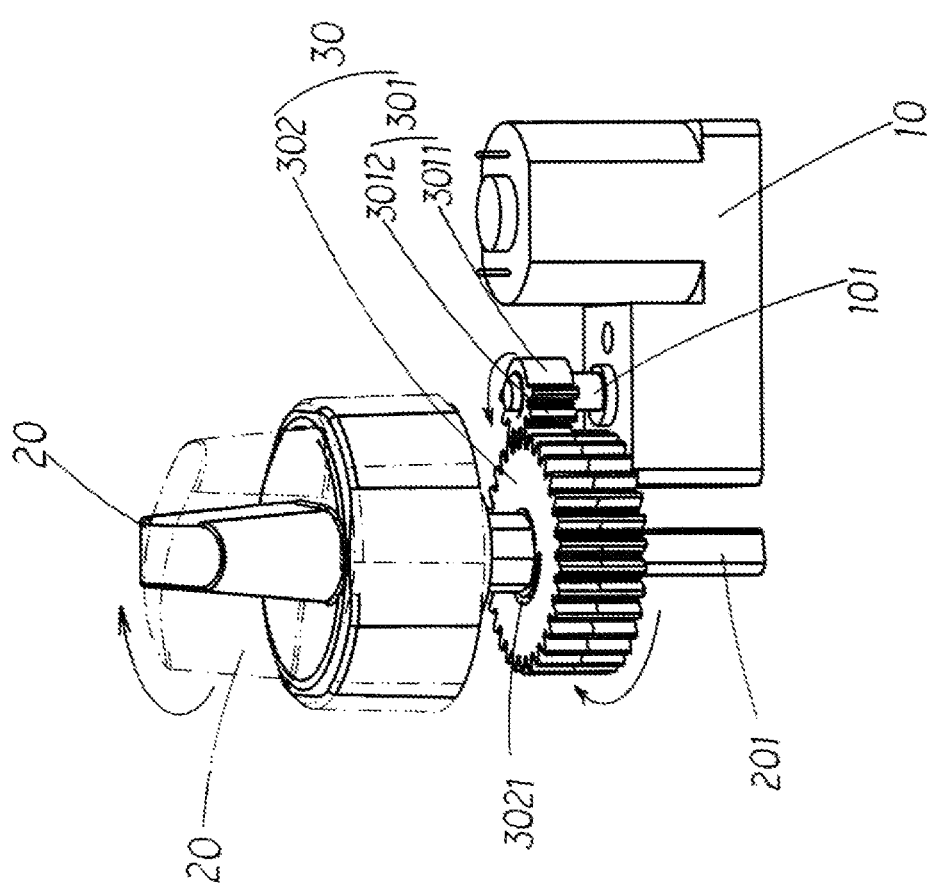
FIG. 10 is a three-dimensional schematic diagram of the first embodiment applied to a stove automatic turning-off machine that performs automatic turning-off according to the invention.

In another word, when the disclosure is applied to an automatic turning-off mechanism in a stove, with reference to FIG. 9 and FIG. 10, when the loading 20 (a stove knob) is rotated to "off" state, the power source 10 (a motor assembly) sets the teeth missing portion 3011 of the first output gear 301 of the clutching unit 30 that is tangential with and corresponds to the buffer gear (as shown in FIG. 7) so that the buffer gear 302 and the first output gear 301 show non-mesh clutching state to enable the clutching unit 30 to show clutch without working. Afterward when the loading 20 (the stove knob) disposed to the loading end spindle 201 is rotated to allow the stove to perform ignition motion (as shown in FIG. 9), since the buffer gear 302 of the clutching unit 30 and the first output gear 301 are at non-mesh clutching state, the buffer gear 302 disposed to the loading end spindle 201 is at idle as free rotation state such that the loading 20 (the stove knob) can be easily rotated to perform ignition motion. Afterward when the ignited stove is used to reach set time without turning off (for example, a user forgets to turn off the stove while making soup or boiling water overtime), the power source 10 (the motor assembly) will be controlled and activated to drive the first output gear 301 of the clutching unit 30 to rotate. The teeth missing portion 3011 of the first output gear 301, which rotates, will rotationally come off and correspond to the buffer gear 302, and the wheel teeth portion 3012 then re-meshes the buffer gear 302 to allow the buffer gear 302 to be driven to reversely rotate. The loading end spindle 201, which rotates together, can directly drive the loading 20 (the stove knob) to reversely rotate (as shown in FIG. 10) to perform motion of automatically turning off the stove, thereby achieving safety effect of using the stove.

Figure 13:
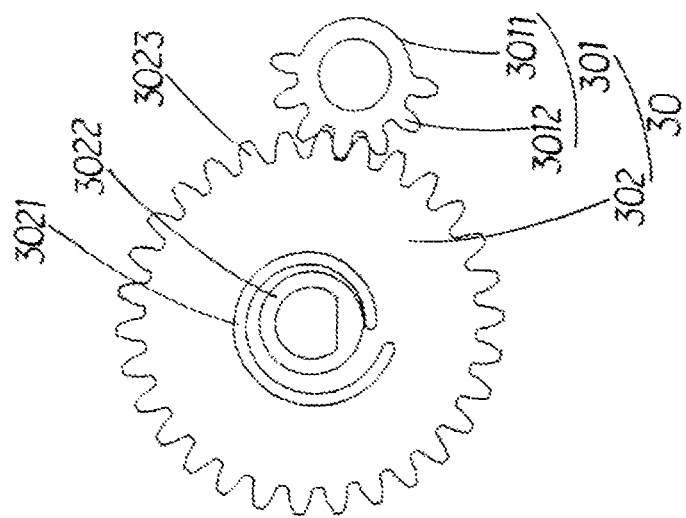
FIG. 13 is a planar schematic diagram of the clutching unit that shows clutching state according to the embodiment of the invention.
Figure 12:
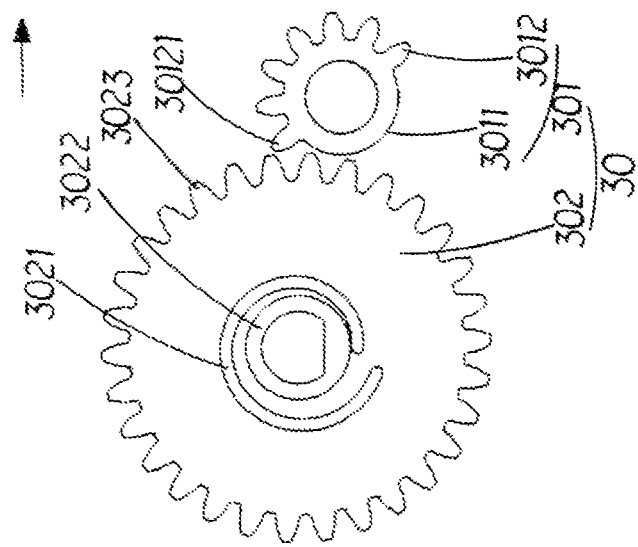
FIG. 12 is a planar schematic diagram of the clutching unit that is ready to enter meshing state according to the embodiment of the invention.
Figure 11:
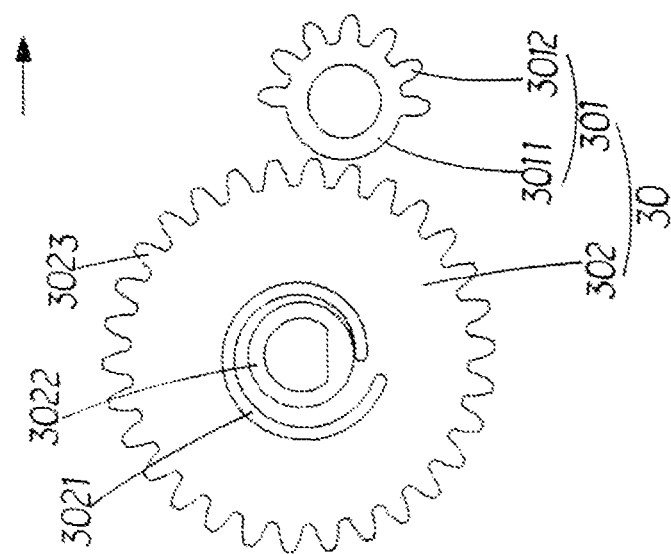
FIG. 11 is a planar schematic diagram of the clutching unit that shows clutching state according to the embodiment of the invention.

In the disclosure, the clutching unit 30 that enters meshed state from clutching state can be shown in FIG. 11, FIG. 12 and FIG. 13. When the first output gear 301 rotates to allow the teeth missing portion 3011 coming off the buffer gear 302, and the wheel teeth portion 3012 re-meshes the buffer gear 302 to enable the clutching unit 30 to re-work, the probability of generating tooth top interference between the first tooth 30121 of the wheel teeth portion 3012 of the first output gear 301 and the buffer gear 302 is normally and relatively enhanced, and the power source 10 (the motor assembly) will easily occur block-turn to cause situation of damaging mechanism. However, the buffer gear 302 according to the disclosure has design of the cutting groove 3021 on the circumference to allow the gear axle core 3022 and the gear teeth 3023 to form non-rigid connection, and it will generate relative torsional displacement while receiving force. When tooth top interference happens and interference force exceeds in predetermined range, naturally, the buffer gear 302 will generate twist to eliminate tooth top interference so that the first tooth 30121 of the wheel teeth portion 3012 of the first output gear 301 and the gear teeth 3023 of the buffer gear 302 are guided to a correct meshing compartment to enable the power source 10 (the motor assembly) to successfully prevent block-turn from occurring, thereby achieving effect of protecting mechanism.

A quantity of missing teeth in the teeth missing portion 3011 of the first output gear 301 takes a principle that avoids meshing the buffer gear 302. The clutching motion between the first output gear 301 and the buffer gear 302 will be extremely reliable to further achieve smoothness effect of ensuring mechanical operation.

The way of delivering the power source 10 to the loading 20 in the gear two-way clutching mechanism according to the invention does not limit to the clutching unit 30 that is taken as transmission chain and can also take the clutching unit 30 as a basis in response to different use demands. A deceleration unit 40 can be selectively cascaded to a rear and/or front sections of the clutching unit 30 to change speed reduction ratio of the transmission chain so as to further achieve effect of enhancing or changing output torque. However, the clutching unit 30 co-composed of the first output gear 301 having design of the teeth missing portion 3011 and the buffer gear 302 having design of the cutting groove 3021 is a necessary composition for the transmission chain in the disclosure.

Figure 14:
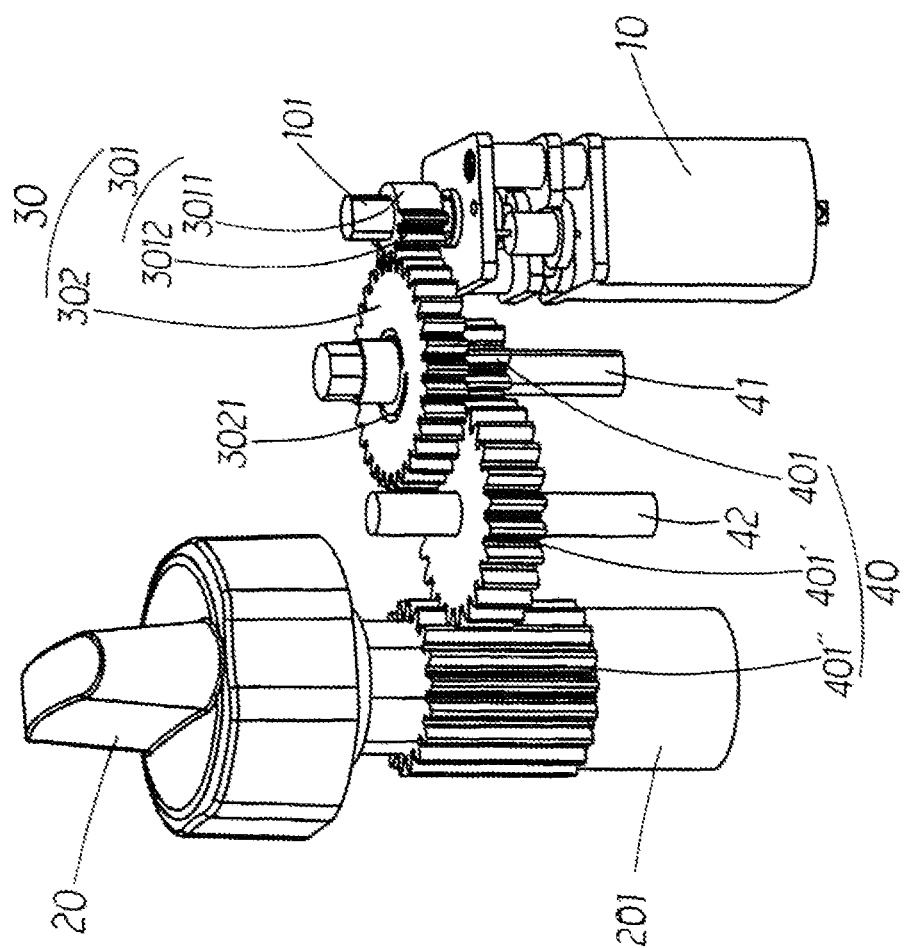
FIG. 14 is a three-dimensional schematic diagram of cascading the deceleration unit to a rear section of the clutching unit according to a second embodiment of the invention.
Figure 15:
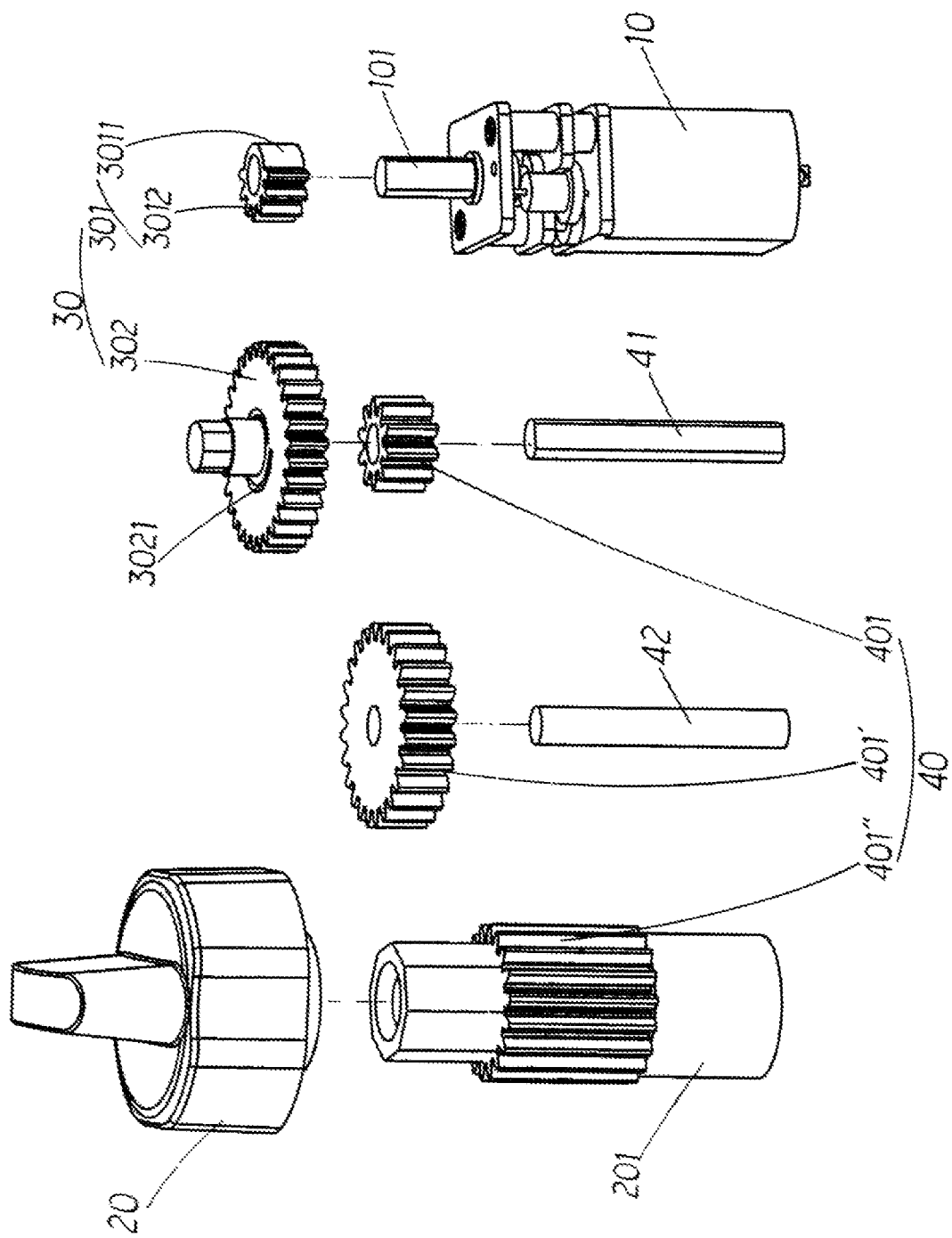
FIG. 15 is an exploded structure drawing according to FIG. 14.

With reference to FIG. 14 and FIG. 15 for another better configuration that illustrates the implemented disclosure according to a second embodiment is provided, wherein the transmission chain connected between the power output shaft 101 of the power source 10 and the loading end spindle 201 of the loading 20 comprises the clutching unit 30 co-composed of the first output gear 301 having design of the teeth missing portion 3011 disposed to the power output shaft 101 and the buffer gear 302 having design of the cutting groove 3021 and connected to the first output gear 301. Moreover, a deceleration unit 40 is connected to the rear section of the clutching unit 30. The deceleration unit 40 is disposed with at least two deceleration gears (a first deceleration gear 401, a second deceleration gear 401', a third deceleration gear 401" as shown in FIG. 14). Each of the deceleration gears is meshed to each other to transmit power, wherein the deceleration gear 401 (the first deceleration gear 401) and the buffer gear 302 of the clutching unit 30 are co-axially fixed to the first stationary shaft 41 to allow it to synchronously rotate together with the buffer gear 302, wherein the deceleration gear 401" (the third deceleration gear 401") is disposed to the loading end spindle 201. The power outputted from the power source 10 can be transmitted to the loading end spindle 201 through the clutching unit 30 and the deceleration unit 40 since remaining deceleration gears 401' (the second deceleration gears 401') disposed to the second stationary shaft 42 mesh to each other, and the loading 20 is rotated together.

Figure 16:
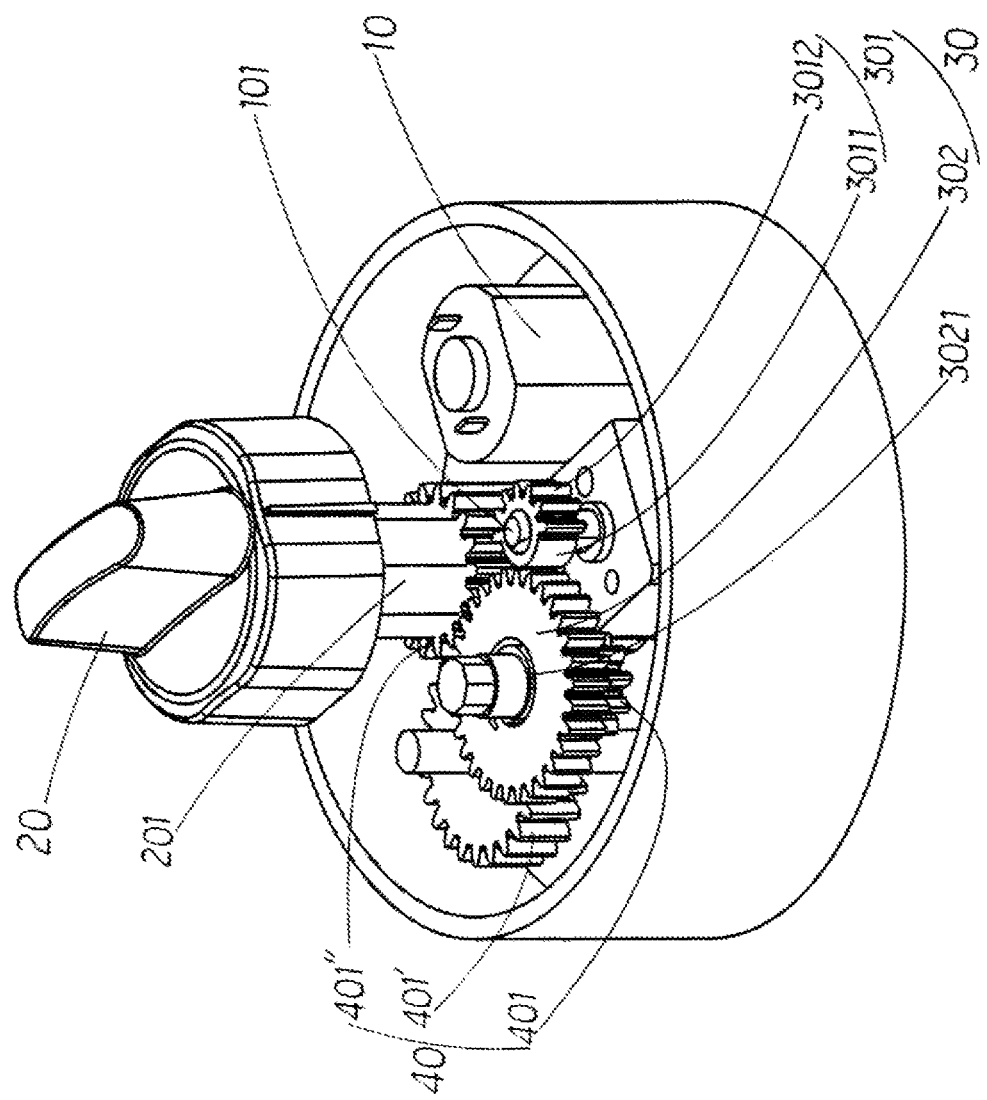
FIG. 16 is a three-dimensional schematic diagram of the second embodiment applied to a stove automatic turning-off machine that shows clutching state according to the invention.
Figure 17:
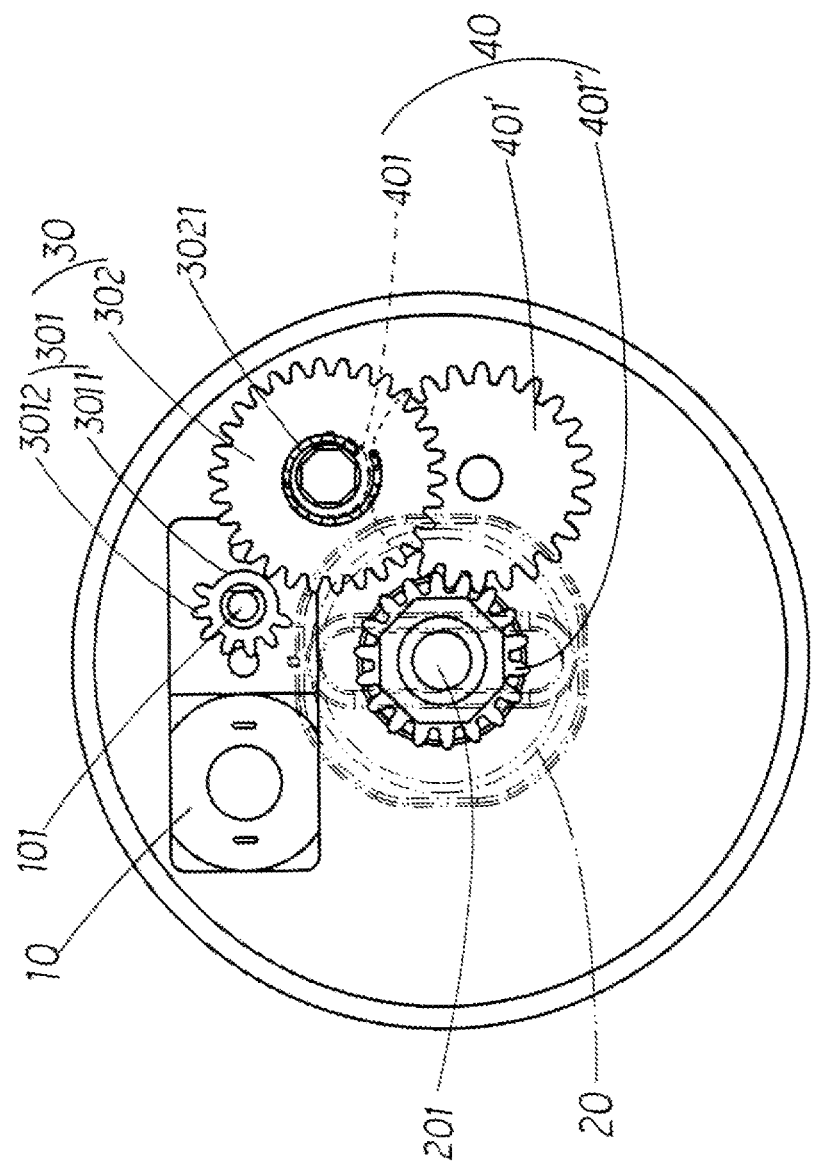
FIG. 17 is a top view schematic diagram according to FIG. 16.
Figure 18:
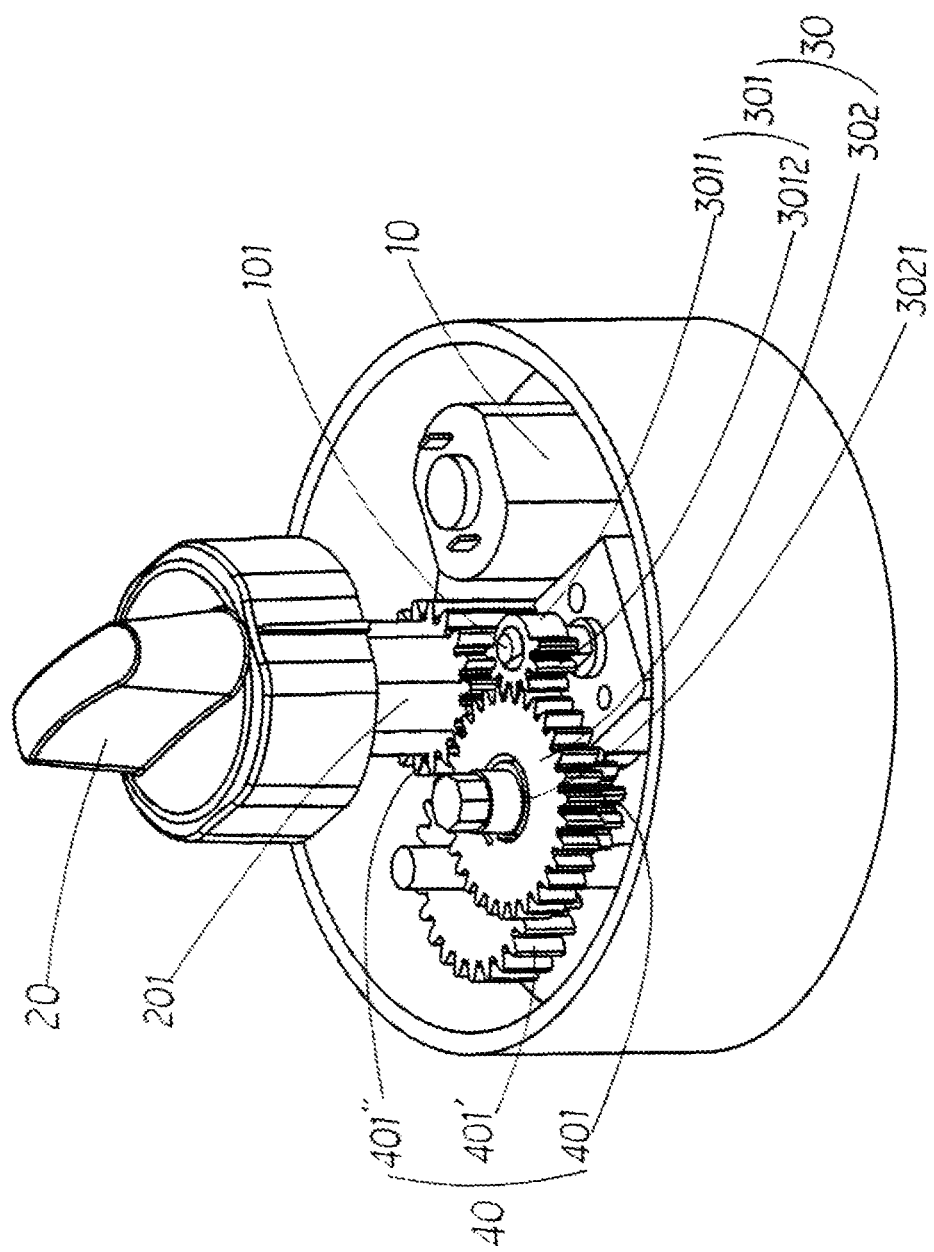
FIG. 18 is a three-dimensional schematic diagram of the second embodiment applied to a stove automatic turning-off machine that shows meshing state according to the invention.
Figure 19:
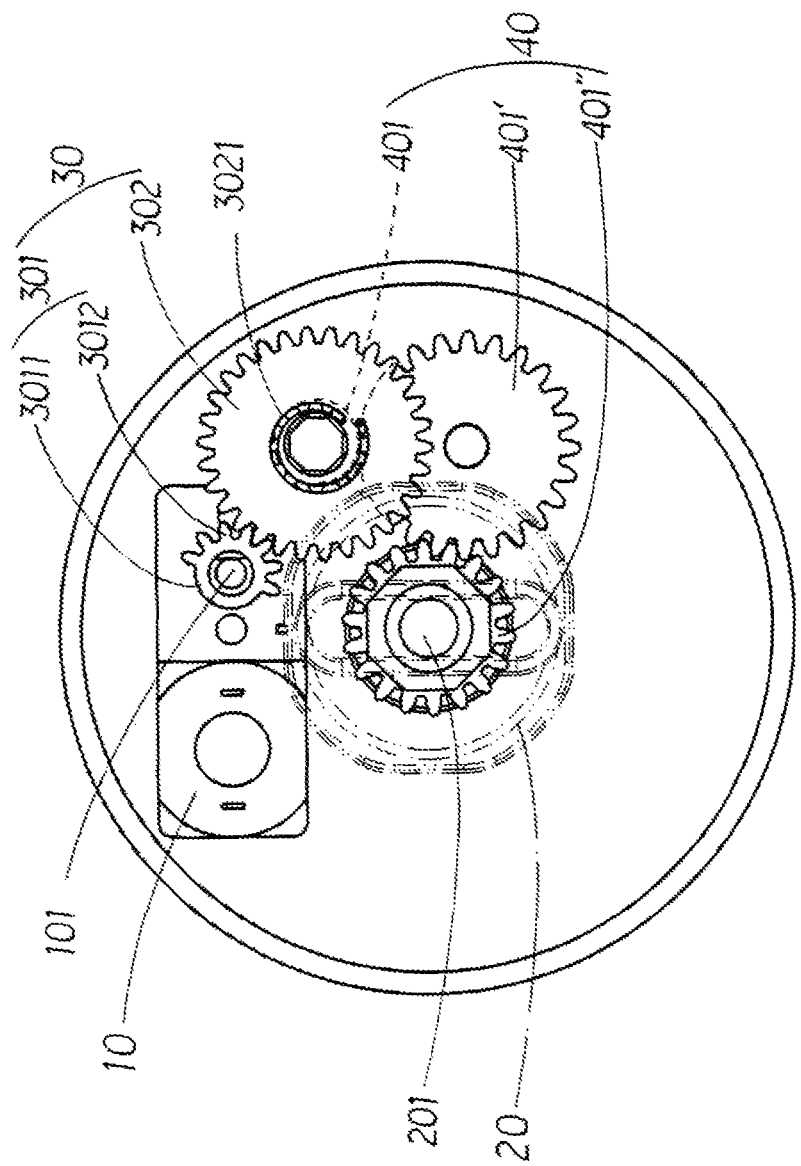
FIG. 19 is a top view schematic diagram according to FIG. 18.

When the transmission chain composed of cascading the deceleration unit 40 to the rear section of the clutching unit 30 is applied to the stove automatic turning-off mechanism, with reference to FIG. 16, FIG. 17, FIG. 18, FIG. 19. When the loading 20 (the stove knob) is rotated to turn-off state, the power source 10 (the motor assembly) sets the teeth missing portion 3011 of the first output gear 301 of the clutching unit 30 to be tangential with and corresponding to the buffer gear 302 (as shown in FIG. 16 and FIG. 17) so that the buffer gear 302 and the first output gear 301 are at non-meshed clutching state, and the clutching unit 30 is at non-work clutching state. By rotating the loading 20 (the stove knob) disposed to the loading end spindle 201, when the stove performs ignition motion, the third deceleration gear 401" disposed to the loading end spindle 201, the second deceleration gear 401' and the first deceleration gear 401, which mesh to each other, of the deceleration unit 40 and the buffer gear 302 coaxially disposed with the first deceleration gear 401 will show idle as freedom rotation state since the buffer gear 302 and the first output gear 301 of the clutching unit 30 are at non-meshed clutching state (as shown in FIG. 16 and FIG. 17) so that the loading 20 (the stove knob) can be easily rotated to perform stove ignition motion. When the ignited stove is used to reach set time and not turned off (the user forgets to turn off the stove while cooking soup or boiling water as overcooking), the power source 10 (the motor assembly) will be controlled and activated to drive the first output gear 301 of the clutching unit 30 for rotating. The teeth missing portion 3011 of the first output gear 301 in rotating would rotate and come off the buffer gear 302, and the wheel teeth portion 3012 instantly re-meshes the buffer gear 302 (as shown in FIG. 18, FIG. 19) so that the buffer gear 302 is driven to reversely rotate. At the same time, the first deceleration gear 401 of the deceleration unit 40 coaxially disposed together with the buffer gear 302 also drives the second deceleration gear 401' and the third deceleration gear 401" meshed to each other to reversely rotate in accordance with rotation of the buffer gear 302, and the loading end spindle 301 provided for disposing the third deceleration gear 401" would also rotate reversely. Accordingly, it can be directly driven to reversely rotate to perform a motion of automatically turning off the stove, thereby enhancing safety effect of using the stove.

Figure 20:
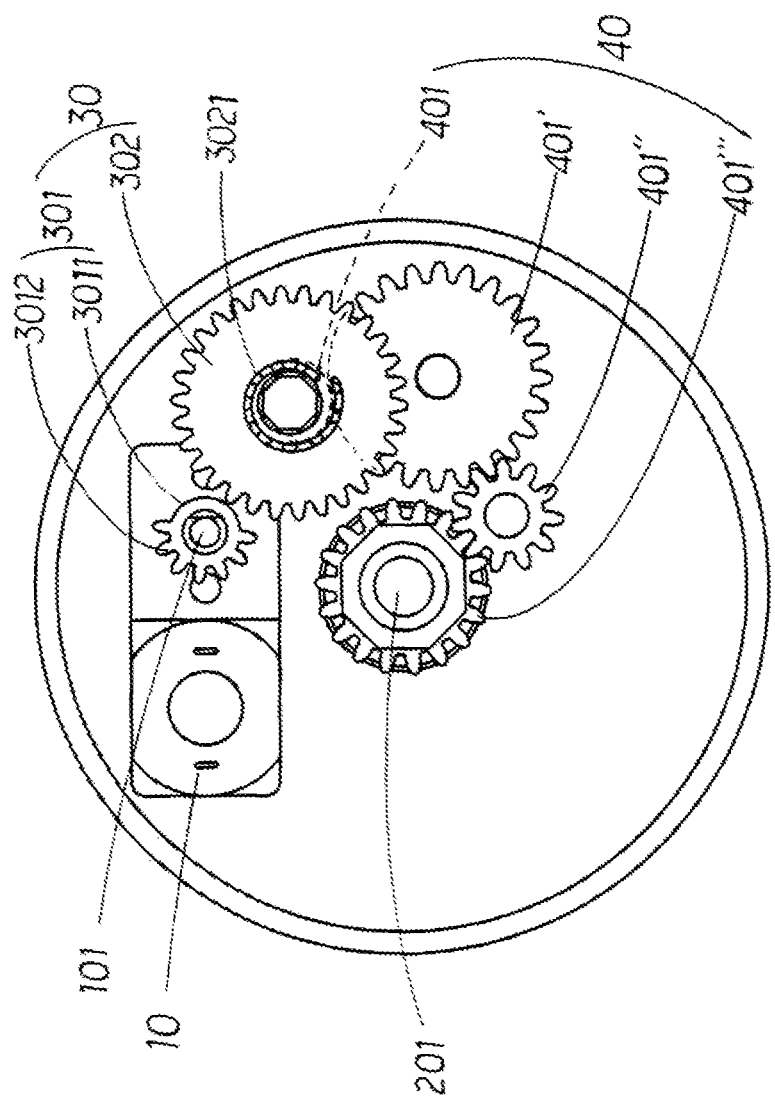
FIG. 20 is a top view schematic diagram of cascading the deceleration unit to a rear section of the clutching unit according to a third embodiment of the invention.

With reference to FIG. 20 for a third embodiment according to the disclosure, wherein the first output gear 301 of the clutching unit 30 is disposed to the power output shaft 101 of the power source 10 and connected to the buffer gear 302 to compose the transmission chain. The rear section of the clutching unit 30 can be also connected to the deceleration unit 40 composed of more deceleration gears (such as the first deceleration gear 401, the second deceleration gear 401', the third deceleration gear 401" and a fourth deceleration gear 401'''). Accordingly, by utilizing the clutching unit 30 connected between the power source 10 and the loading 20 and collaborating the deceleration unit 40, which has a plurality of deceleration gears, connected to the rear section of the clutching unit 30, the composed transmission chain according to the disclosure can achieve anticipated clutching effect and effect of enhancing or changing speed reduction ratio.

Figure 21:
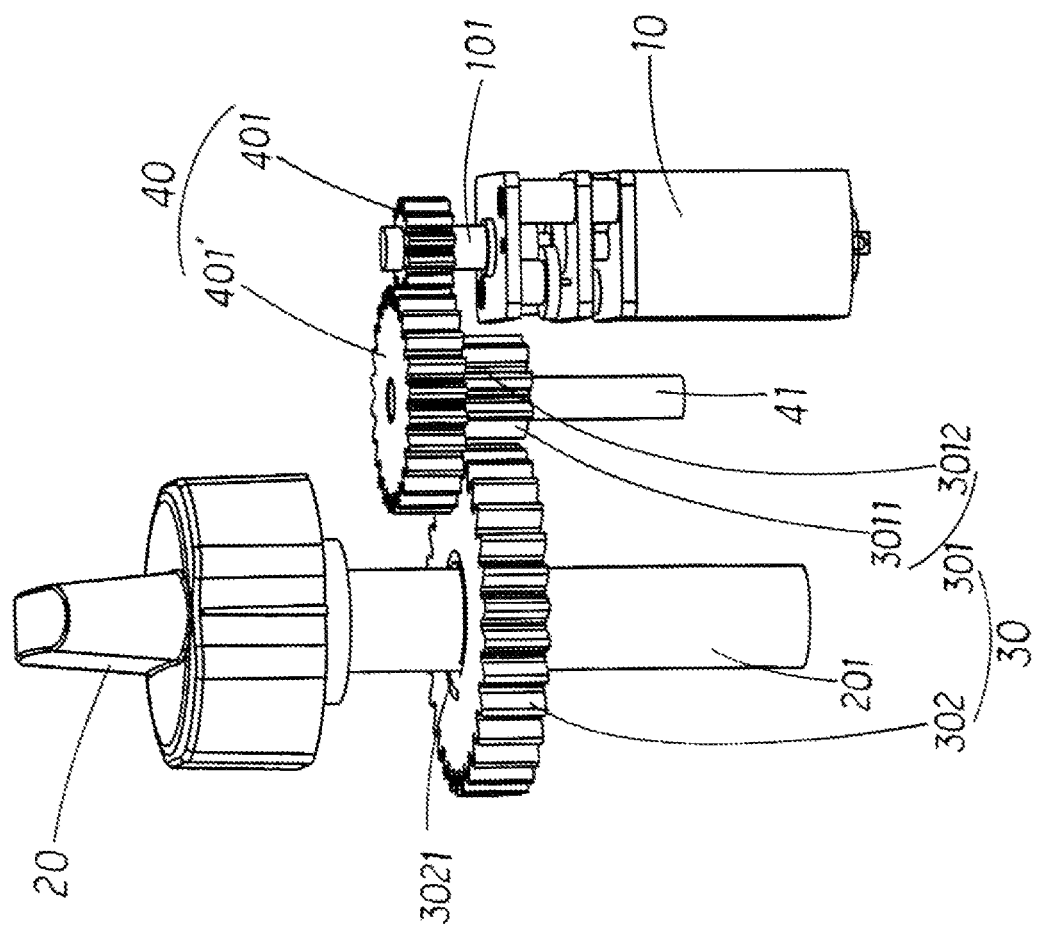
FIG. 21 is a three-dimensional schematic diagram of cascading the deceleration unit to a front section of the clutching unit according to a fourth embodiment of the invention.
Figure 22:
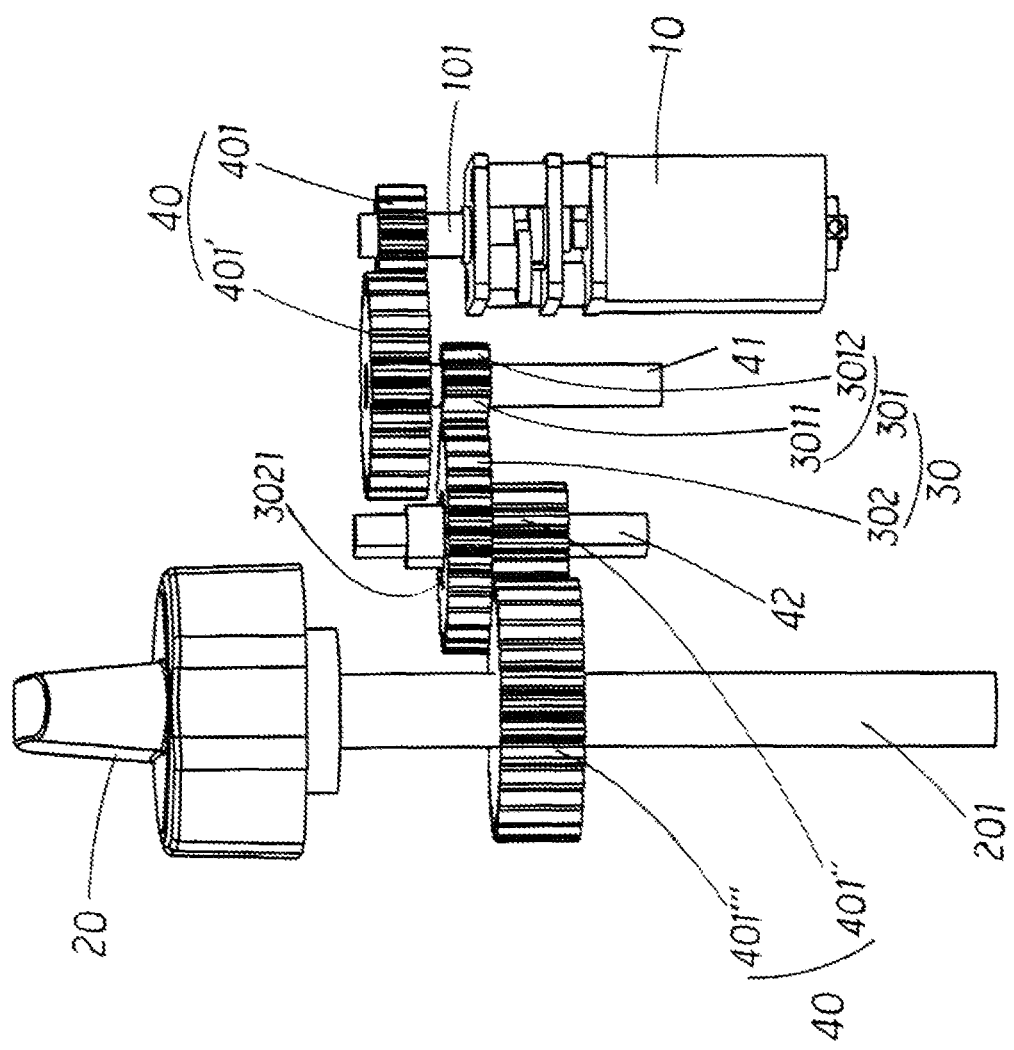
FIG. 22 is a three-dimensional schematic diagram of cascading the deceleration unit to a front section of the clutching unit according to a fifth embodiment of the invention.

With reference to FIG. 21 for a fourth embodiment according to the disclosure and FIG. 22 for a fifth embodiment according to the disclosure, the transmission chain connected between the power output shaft 101 of the power source 10 and the loading end spindle 201 of the loading 20 can also connect the deceleration unit 40 at a front section of the clutching unit 40. For example, the first deceleration gear 401 of the deceleration unit 40 is firstly disposed to the power output shaft 101 of the power source 10. The second deceleration gear 401' of the deceleration unit 40 is disposed to the first stationary shaft 41. The first deceleration gear 401 and the second deceleration gear 401' remain meshing. The clutching unit 30 disposed to the rear section of the deceleration unit 40 can coaxially dispose the first output gear 301 having the teeth missing portion 3011 and any other deceleration gear of the deceleration unit 40 (as shown in FIG. 21, the first output gear 301 and the second deceleration gear 401' are coaxially disposed to the first stationary shaft 41).

The buffer gear 302, which is disposed with the cutting groove 3021, disposed connected to the first output gear 301 can be disposed to the loading end spindle 201 (as shown in FIG. 21), or the buffer gear 302 can be also disposed to any other stationary shaft (as shown in FIG. 22, the buffer gear 302 is disposed to the second stationary shaft 42 and transmits power to the fourth deceleration gear 401''' of the loading end spindle 201 through the coaxially disposed third deceleration gear 401'') between the power output shaft 101 and the loading end spindle 201. Accordingly, by utilizing the clutching unit 30 connected between the power source 10 and the loading 20 and the deceleration unit 40 connected to the front section of the clutching unit 30, the transmission chain composed of mutually collaborating the clutching unit 30 and the deceleration unit 40 can achieve anticipated clutching effect, purpose and effect of enhancing or changing speed reduction ratio at the same time.

Since the clutching unit 30 and the deceleration unit 40 are connected between the power source 10 and the loading 20, the transmission chain can achieve clutching and effect of enhancing or changing speed reduction ratio. When the power source 10 drives the first output gear 301 of the clutching unit 30 to rotate and the wheel teeth portion 3012 of the first output gear 301 stops at meshed state, externally rotation force of the loading 20 is difficult to transmit back to the power source 10 through the deceleration unit 40 having high speed reduction ratio, thereby achieving purpose of self-locking. In another word, when the disclosure is applied to operation of automatically turning off the stove, the loading 20 (the stove knob) is rotated to turn-off state (as shown in FIG. 17). The first output gear 301 of the clutching unit 30 originally takes the teeth missing portion 3011 to be tangential with and corresponding to the buffer gear 302 so that the loading 20 (the stove knob) can freely rotate. However, upon use demand, the user can additionally operate and control activation of the power source 10 (the motor assembly) to enable the first output gear 301 to rotate and to immediately stop the first output gear 301 when the gear portion 3012 meshes the buffer gear 302. Under high reduction ratio of the deceleration unit 40, rotation force imposed to the loading 20 (the stove knob) will be difficult to transmit back to the power source 10 (the motor assembly) so that the loading 20 (the stove knob) is unable to be randomly rotated. Accordingly, it can exactly prevent the stove knob from being randomly rotated by children to cause ignition motion, thereby achieving safety effect of using the stove.

The timing of controlling activation and stopping movement of the power source 10 (the motor assembly) can be controlled by a timer in the control circuit or different sensors or micro-switch.

In other words, using the disclosure has the following advantages:
1. The design is simple, manufacture costs is low, and it has implementation economy.
2. Structure is pure, assembling is convenient, and it has implementation convenience.
3. The space used by mechanism can be saved to achieve effect of expanding use range.
4. The operation efficiency and use safety of mechanism clutching and meshing can be enhanced.

While the present invention has been described by means of specific embodiments, numerous modifications and variations could be made thereto by those skilled in the art without departing from the scope and spirit of the invention set forth in the claims.

What is claimed is:

1. A gear two-way clutching mechanism affecting between power output and loading and comprising a power source, a loading, a clutching unit and a deceleration unit; wherein the power source is provided for power outputting and delivering rotation power to the loading through the clutching unit and the deceleration unit and disposed with a power output shaft; the loading having a loading end spindle connected to the clutching unit and the deceleration unit, and of being driven by rotation power outputted from the power source; the clutching unit being connected between the power output shaft of the power source and the loading end spindle of the loading and selectively connected to the deceleration unit and transmitting rotation power outputted by the power source to the loading by collaborating with the deceleration unit or disconnecting power of the power source from the loading and enabling the loading to freely rotate, the clutching unit having a first output gear and a buffer gear, the first output gear being coupled to the power output shaft of the power source and the buffer gear being coupled to a stationary shaft between the power output shaft and the loading end spindle, the first output gear having a teeth missing portion and a wheel teeth portion, the buffer gear having gear teeth and capable of being tangential with and corresponding to the teeth missing portion of the first output gear or meshing with the wheel teeth portion of the first output gear, the buffer gear, having a gear axle core and the gear teeth of the buffer gear having a non-rigid connection therewith, the buffer gear having a pierced cutting groove formed circumferentially therein, the pierced cutting groove being formed as a spiral cutting groove or a ring-shaped cutting groove or the pierced cutting groove being distributed to the circumference of the buffer gear by way of heteromorphy and formed as plural cutting grooves; the deceleration unit being connected between the power output shaft of the power source and the loading end spindle of the loading and connected to the clutching unit, the deceleration unit transmitting rotation power outputted by the power source to the loading through the clutching unit and disposed with at least two deceleration gears meshed to each other.

2. The gear two-way clutching mechanism of claim 1, wherein one of the at least two deceleration gears meshed to each other in the deceleration unit being respectively connected to the power output shaft of the power source or connected to the loading end spindle of the loading or coaxially connected to the first output gear of the clutching unit or coaxially connected to the buffer gear of the clutching unit.

3. The gear two-way clutching mechanism of claim 1, wherein the power source is a motor assembly.

4. The gear two-way clutching mechanism of claim 1, wherein the wheel teeth portion of the first output gear of the clutching unit and the gear teeth of the buffer gear are the same modulus.

5. The gear two-way clutching mechanism of claim 1, wherein the teeth missing portion of the first output gear of the clutching unit has an absence of not less than two teeth.

* * * * *